United States Patent
McCaslin et al.

(10) Patent No.: US 12,408,594 B2
(45) Date of Patent: Sep. 9, 2025

(54) ELECTRICAL STIMULATION DEVICE

(71) Applicant: RYJA LLC, Danville, KS (US)

(72) Inventors: Steve McCaslin, Danville, KS (US); Steven Selikoff, Seattle, WA (US)

(*) Notice: Subject to any disclaimer, the term of this patent is extended or adjusted under 35 U.S.C. 154(b) by 0 days.

(21) Appl. No.: 18/482,844

(22) Filed: Oct. 6, 2023

(65) Prior Publication Data

US 2024/0114845 A1 Apr. 11, 2024

Related U.S. Application Data

(60) Provisional application No. 63/413,958, filed on Oct. 6, 2022.

(51) Int. Cl.
*A01G 7/04* (2006.01)

(52) U.S. Cl.
CPC ...................... *A01G 7/04* (2013.01)

(58) Field of Classification Search
CPC ............. A01G 7/04; A01G 9/26; A01G 9/243
See application file for complete search history.

(56) References Cited

U.S. PATENT DOCUMENTS

| | | | | |
|---|---|---|---|---|
| 5,819,467 A | * | 10/1998 | Zucker | A01G 7/04 47/60 |
| 2011/0096454 A1 | * | 4/2011 | Corsi | A01G 7/04 361/212 |
| 2014/0259920 A1 | * | 9/2014 | Wilson | A01G 7/045 47/62 R |
| 2015/0282436 A1 | * | 10/2015 | Zheng | A01G 7/04 47/1.3 |
| 2019/0203238 A1 | * | 7/2019 | Chen | A01H 3/02 |
| 2024/0324516 A1 | * | 10/2024 | Castagna | H01Q 21/00 |

FOREIGN PATENT DOCUMENTS

| | | | | |
|---|---|---|---|---|
| AU | 2021107124 A4 | * | 12/2021 | ............ A01G 7/04 |
| CN | 112930919 A | * | 6/2021 | ............ A01G 7/04 |
| KR | 20030051123 A | * | 6/2003 | |
| KR | 20170077357 A | * | 7/2017 | |

* cited by examiner

*Primary Examiner* — Trinh T Nguyen
(74) *Attorney, Agent, or Firm* — Intelltual Strategies

(57) ABSTRACT

A system for electrical stimulation to aid in plant growth includes a device for stimulating an electrical current. The device includes a self-contained power source within a housing, an electrical conduit coupled to the self-contained power source, and a visual indicator on the housing. The electrical conduit is configured to conduct an electrical charge. The visual indicator is configured to indicate to a user that the electrical conduit is conducting an electrical charge. The self-contained power source is configured to power the electrical charge as well as the visual indicator.

16 Claims, 7 Drawing Sheets

ELECTRICAL STIMULATION DEVICE

RELATED APPLICATIONS

This application claims the benefit of U.S. Provisional Patent Application No. 63/413,958, filed Oct. 6, 2022, which is incorporated herein by reference in its entirety.

BACKGROUND

This disclosure relates generally to a device for stimulating growth in plants. More specifically, this disclosure relates generally to an electrical stimulation device for aiding in plant growth.

The first historical scientific documents about electroculture are from 1745 from Abbot Nollet. Between 1745 and 1910 there have been over 500 documented researchers working on the study of electroculture. In 1900 the St. Petersburg Electro-Technical Society confirmed the positive effects of low voltage stimulation on plant growth. In 1912 there was an international conference in Reims, France. In 1918 Great Britain created an official electroculture committee. The committee concluded that electroculture that the effect was real and had consistent success. It was disbanded in 1936 for budgetary reasons, and presumably the world events that were leading to WWII.

Electroculture is growing and is greatly helping the growth of plants in various environments. Systems and devices and methods described herein show a new and improved way to utilize electroculture for plant growth stimulation in a reliable and repeatable way in a variety of locations and in-home environments. These systems and devices are improvements over the existing known art.

SUMMARY

The subject matter of the present application has been developed in response to the present state of the art, and in particular, in response to the problems and disadvantages associated with conventional devices that have not yet been fully solved by currently available techniques. Accordingly, the subject matter of the present application has been developed to provide embodiments of a system, apparatus, and method that overcome at least some of the shortcomings of prior art techniques.

Disclosed herein is a system for electrical stimulation to aid in plant growth. The system includes a device for stimulating an electrical current. The device includes a self-contained power source within a housing, an electrical conduit coupled to the self-contained power source, and a visual indicator. The electrical conduit is configured to conduct an electrical charge. The visual indicator is configured to indicate to a user that the electrical conduit is conducting an electrical charge. The self-contained power source is configured to power the electrical charge as well as the visual indicator. The preceding subject matter of this paragraph characterizes example 1 of the present disclosure.

The electrical conduit includes a first prong, the first prong configured to conduct the electrical charge and to be inserted into ground near a plant. The preceding subject matter of this paragraph characterizes example 2 of the present disclosure, wherein example 2 also includes the subject matter according to example 1, above.

The electrical conduit includes a second prong, wherein the electrical charge is configured to pass through a medium between the first prong and the second prong. The preceding subject matter of this paragraph characterizes example 3 of the present disclosure, wherein example 3 also includes the subject matter according to any one of examples 1-2, above.

The self-contained power source includes a solar cell. The preceding subject matter of this paragraph characterizes example 4 of the present disclosure, wherein example 4 also includes the subject matter according to any one of examples 1-3, above.

The device further comprises an energy storage device, wherein the energy storage device is configured to store power generated by the solar cell and power the electrical charge when the solar cell is not charging. The preceding subject matter of this paragraph characterizes example 5 of the present disclosure, wherein example 5 also includes the subject matter according to any one of examples 1-4, above.

The energy storage device comprises a capacitor within the housing. The preceding subject matter of this paragraph characterizes example 6 of the present disclosure, wherein example 6 also includes the subject matter according to any one of examples 1-5, above.

The device further comprises an energy storage device, wherein the energy storage device is configured to store power collected by an external source. The preceding subject matter of this paragraph characterizes example 7 of the present disclosure, wherein example 7 also includes the subject matter according to any one of examples 1-6, above.

The visual indicator is a mechanical visual indicator. The preceding subject matter of this paragraph characterizes example 8 of the present disclosure, wherein example 8 also includes the subject matter according to any one of examples 1-7, above.

The visual indicator is an electrical visual indicator. The preceding subject matter of this paragraph characterizes example 9 of the present disclosure, wherein example 9 also includes the subject matter according to any one of examples 1-8, above.

The device further includes a transmitting device, wherein the transmitting device is configured to transmit to a receiving device an indication of electrical charge in the electrical conduit. The preceding subject matter of this paragraph characterizes example 10 of the present disclosure, wherein example 10 also includes the subject matter according to any one of examples 1-9, above.

The system further comprises a disabling switch for the visual indicator, wherein the disabling switch disables the visual indicator. The preceding subject matter of this paragraph characterizes example 11 of the present disclosure, wherein example 11 also includes the subject matter according to any one of examples 1-10, above.

The self-contained power source comprises a battery. The preceding subject matter of this paragraph characterizes example 12 of the present disclosure, wherein example 12 also includes the subject matter according to any one of examples 1-11, above.

The device further includes a printed circuit board within the housing, wherein the printed circuit board is configured to divert power to the visual indicator and the electrical conduit. The preceding subject matter of this paragraph characterizes example 13 of the present disclosure, wherein example 13 also includes the subject matter according to any one of examples 1-12, above.

The printed circuit board is configured to constrain a power level to the electrical conduit. The preceding subject matter of this paragraph characterizes example 14 of the present disclosure, wherein example 14 also includes the subject matter according to any one of examples 1-13, above.

The printed circuit board is configured to amplify a power level to the electrical conduit. The preceding subject matter of this paragraph characterizes example 15 of the present disclosure, wherein example 15 also includes the subject matter according to any one of examples 1-14, above.

Disclosed herein is a device for electrical stimulation to aid in plant growth. The device includes a self-contained power source within a housing, an electrical conduit coupled to the self-contained power source, the electrical conduit configured to conduct an electrical charge, a visual indicator, and a moisture meter incorporated into the housing. The visual indicator is configured to indicate to a user that the electrical conduit is conducting an electrical charge. The self-contained power source is configured to power the electrical charge, the visual indicator, and the moisture meter. The preceding subject matter of this paragraph characterizes example 16 of the present disclosure.

The electrical conduit includes a first prong, the first prong configured to conduct the electrical charge and to be inserted into ground near a plant, and a second prong. The electrical charge is configured to pass through a medium between the first prong and the second prong. The preceding subject matter of this paragraph characterizes example 17 of the present disclosure, wherein example 17 also includes the subject matter according to example 16, above.

The self-contained power source comprises a solar cell. The device further comprises an energy storage device. The energy storage device is configured to store power generated by the solar cell and power the electrical charge when the solar cell is not charging. The device further comprises a printed circuit board within the housing, wherein the printed circuit board is configured to divert power to the visual indicator and the electrical conduit. The printed circuit board is configured to limit a power level to the electrical conduit. The preceding subject matter of this paragraph characterizes example 18 of the present disclosure, wherein example 18 also includes the subject matter according to any one of examples 16-17, above.

Disclosed herein is a method for introducing an electrical stimulation to aid in plant growth. The method includes generating power via a self-contained power source within a housing, conducting an electrical charge from the self-contained power source to an electrical conduit, conducting power from the self-contained power source to a visual indicator on the housing, and enabling a visual indication that the electrical conduit is conducting an electrical charge. The preceding subject matter of this paragraph characterizes example 19 of the present disclosure.

The self-contained power source is a solar cell. The electrical conduit comprises a first and second prong. The method further includes generating the electrical charge through a medium between the first and second prongs. A printed circuit board constrains a power level to the electrical conduit. The preceding subject matter of this paragraph characterizes example 20 of the present disclosure, wherein example 20 also includes the subject matter according to example 19, above.

BRIEF DESCRIPTION OF DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered limiting of its scope, the subject matter will be described and explained with additional specificity and detail through the use of the drawings.

Figure 1:
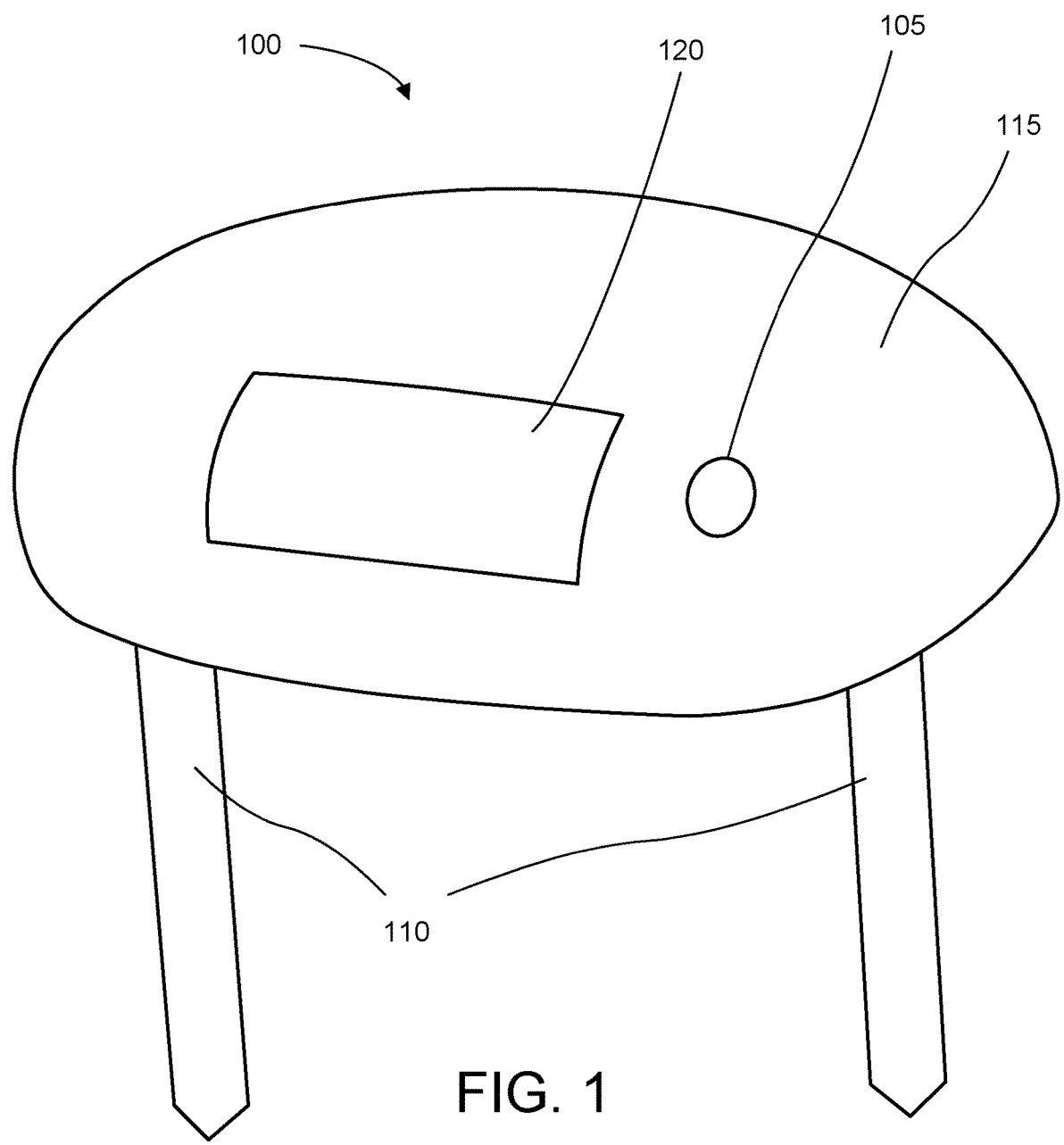
FIG. 1 depicts a perspective view of a system and device for electrically stimulating plants, according to one or more embodiments of the invention.

Throughout the description, similar reference numbers may be used to identify similar elements. Throughout this application, similar designations or vocabulary may be used to identify similar elements, although the breadth of this disclosure should be understood to incorporate any alternatives and variations referenced within the specification (including the claims) and the accompanying drawings.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

The expression "configured to" as used herein may be used interchangeably with "suitable for," "having the capacity to," "designed to," "adapted to," "made to," or "capable of" according to a context. The term "configured" does not necessarily mean "specifically designed to" at a hardware level. Instead, the expression "apparatus configured to . . . " may mean that the apparatus is "capable of . . . " along with other devices or parts in a certain context.

While many embodiments are described herein, at least some of the described embodiments describe a system or an electrical stimulation device for plant growth. In an illustrative embodiment, the system includes a power source, a device for stimulating an electrical current, and a visual indicator. In many embodiments, the power source is configured to power both the device for stimulating an electrical current and the visual indicator. The system may be placed in the soil, above the soil, or near the soil in a location whereby an electrical current will be applied near a plant to stimulate growth. In many applications, the system is placed and left in an outdoor environment. To give the user an indication the system is working and the device for stimulating an electrical current is actually working, the system includes the visual indicator which is also powered by the power source. The visual indicator allows for the user to know that the device is working.

Although described in conjunction with soil, it is contemplated that in some embodiments, the system and device may be utilized with hydroponics or other plant growing operations that do not include dirt or soil. The proximity of electrical stimulation to the plant and root system can be effectuated by the system and device without any soil or dirt.

In some embodiments, the system includes a covering or housing. In some embodiments, the housing can be decorative or allow for the device to blend into the environment by appearing to be a rock or other object that is seen near plants.

The housing or covering may be used to house the electronic components of the device or system. In some embodiments, the device or system utilizes a circuit board or other electrical circuitry that is protected from the elements. In many illustrated embodiments herein, the system or device may include a ground or an electrical prong(s). The electrical prong(s) may serve as both the source of the electrical charge (allowing for a charge to be stimulated between the prong(s) as well as a physical post that keeps the device and system secured in the soil or dirt.

Various embodiments are shown in the figures of embodiments of the system and device. The shape and sizes are just illustrative. Variations of these shapes and sizes are contemplated herein and are within the scope of the invention.

In some embodiments, the power source may be a solar cell. For the ease of the device, the solar cell can store and generate power from the sun during the day, allowing for that power to generate a small electrical charge at other times when the solar cell is not charging.

In some embodiments, the power source may be a battery or other portable power source that can generate continual power and further generate a small electrical charge for the device as well as power the visual indicator.

Other embodiments may include other examples of power sources that are small and mobile. Although the majority of embodiments described herein include small and mobile power sources, some embodiments of the invention may include a non-portable power source allowing for the system and device to be plugged in and draw power from an electrical cord or the like.

The system further includes a device for stimulating an electrical current. In many of the illustrated embodiments herein, a small electrical current is generated between two prongs. Such an electrical current is generated to travel between two poles and effect the surrounding environment. The electrical current stimulates growth of the plants. In most cases the magnitude of the electrical current is on the order of micro amperes.

Various levels of electrical current are contemplated. An electrical current above a certain magnitude is not likely to stimulate growth. The compactness of the system and device described herein allows for a minimal charge to be generated. This allows the device to generate the charge for a long time without drawing too much power. This will allow for the power source to more easily power both the electrical current and the visual indicator and a moisture meter (in some embodiments).

Because of the low power and the very small electrical current, many users will not be able to see or tell that the device is working. The addition of a visual indicator allows the user to know that the system and device are working. Such an indicator is helpful to a user as the system and device will many times just sit in the soil for an extended period of time.

The device for stimulating an electrical current may include various electronic components. Such electronic components may include among other things a substrate or a circuit board or printed circuit board. The circuit board may include circuitry that allows for the power source to route power to the device to generate the electrical current and route power to the visual indicator.

In some embodiments, the visual indicator may be part of the circuit board or may be separately electrically connected to the power source. The circuit board may however deliver the message that the electrical current is flowing and turn on the visual indicator.

The visual indicator may include an LED or other light source that when on indicates that an electrical current is flowing and that the device is working. In some embodiments, the visual indicator may include different colors that indicate the status of the device. In other embodiments, the visual indicator could be a physical lever or physical knob where the location of the lever indicates the current status of the device and the electrical current.

Various types of visual indicators are contemplated herein. The visual indicator is configured to indicate whether the electrical current is flowing. This may be done in a myriad of ways including, but not limited to, a display screen, a light, a knob, a lever, a switch, a pop-up button, etc. The visual indicator can be any physical manifestation that indicates whether the electrical current is flowing. The visual indicator can be anything that has two separate visual indications and is capable of receiving a signal that tells whether the device is working.

Disclosed herein is a system for electrical stimulation to aid in plant growth. The system includes a power source, a device for stimulating an electrical current, and a visual indicator. In many embodiments, the power source is configured to power both the device for stimulating an electrical current and the visual indicator. The system may be placed in the soil, above the soil, or near the soil in a location whereby an electrical current will be applied near a plant to stimulate growth. In many applications, the system is placed and left in an outdoor environment. To give the user an indication the system is working and the device for stimulating an electrical current is actually working, the system includes the visual indicator which is also powered by the power source. The visual indicator allows for the user to know that the device is working.

Disclosed herein is a system for electrical stimulation to aid in plant growth. The system includes a device for stimulating an electrical current. The device includes a self-contained power source within a housing, an electrical conduit coupled to the self-contained power source, and a visual indicator. The electrical conduit is configured to conduct an electrical charge. The visual indicator is configured to indicate to a user that the electrical conduit is conducting an electrical charge. The self-contained power source is configured to power the electrical charge as well as the visual indicator.

The electrical conduit may be, in some embodiments, a wire, a contact pad, or a prong that extends out of the housing. In some embodiments, the electrical conduit includes a first prong, the first prong configured to conduct the electrical charge and to be inserted into ground near a plant. In some embodiments, the electrical conduit includes a second prong, wherein the electrical charge is configured to pass through a medium between the first prong and the second prong. The prongs may be able to provide electric conductive ability as well as mechanical structural stability. The device may be placed in the soil or other medium that is near a plant. In this case, "near" is meant to convey adjacent, or within a close distance of a plant (within a few feet of a plant). In some embodiments, the electrical conduit is an electrical pad that is not inserted into the soil but is placed on top of the soil.

In embodiments where the electrical charge is passed through two prongs or two pads, the two prongs or pads are separated by a distance such that the electrical charge passes through a medium. In many cases this medium is soil or dirt, but could be anything that the plant is planted in (such as will hydroponics) or the medium could be air, such that the electrical charge passes through the air from the first prong to the second prong.

In some embodiments, the self-contained power source includes a solar cell. In describing a self-contained power source, the power source is contained within the device such that a device that is plugged in would not be self-contained but a solar cell that converts light or sunlight would be self-contained. Also contemplated within self-contained is a battery power source. A battery is a self-contained power source.

In some embodiments, the device further comprises an energy storage device, wherein the energy storage device is configured to store power generated by the solar cell and power the electrical charge when the solar cell is not charging. The energy storage device may be a battery (different from the power source described above) but a chargeable battery that charges from the solar cell and then can discharge power when needed or directed to by the device or the printed circuit board in the device.

In some embodiments, the energy storage device comprises a capacitor within the housing. A capacitor is another storage device that can charge up from the solar cell (or other power source) and then discharge power when needed or directed to by the device or the printed circuit board in the device.

In some embodiments, the device further comprises an energy storage device, wherein the energy storage device is configured to store power collected by an external source. In such embodiments, the power stored is not from the self-contained power source but from an external source such as a USB charging cable that is plugged in to charge a lithium battery or other energy storage device. Such embodiments, while more complex in some ways would allow for the self-contained power source to power the device and allow for the energy storage device to power the device when the self-contained power source is not operating (such as when the sun is down for a solar cell).

Various types of visual indicators are contemplated herein. In some embodiments, the visual indicator is a mechanical visual indicator. A mechanical visual indicator is a mechanically moving apparatus that indicates whether the device is functioning. And, more specifically, the mechanical visual indicator is an apparatus that indicates that the electrical conduit is conducting a charge. As part of the device, in some embodiments, the printed circuit board or a separate sensor is able to determine whether there is an electrical charge within the electrical conduit.

In some embodiments, the visual indicator is an electrical visual indicator. This could be an LED light, or other electronic display that can indicate that the electrical conduit is conducting a charge.

In some embodiments, the device further includes a transmitting device. In some embodiments, the transmitting device is configured to transmit the indication of whether electrical conduit is conducting a charge. In some embodiments, the transmitting device transmits to a receiving device (external to the device) an indication of electrical charge in the electrical conduit. Such transmission can occur through technologies such as Wi-Fi or Bluetooth or the like. Transmitting to a device or app on a phone, a user can track the functioning and timing of the device during and after operation.

In some embodiments, the system further comprises a disabling switch for the visual indicator, wherein the disabling switch disables the visual indicator. In some cases, a mechanical indicator can make noise from the mechanical movement. As the devices are typically small and utilized for a single plant (or possibly for a few adjacent plants), the use of lot of devices may result in loud amplification of the mechanical visual indicator. As such, a kill switch or off switch for the visual indicator is found on some embodiments.

In some embodiments, the device further includes a printed circuit board within the housing. In some embodiments, the printed circuit board is configured to divert power to the visual indicator and the electrical conduit. In other embodiments, the printed circuit board can divert power to other components of the device, such as the transmitting device or the moisture meter. Having the PCB or other electronic components allows for the single power source to be utilized in various ways unique to novel embodiments of the invention.

In some embodiments, the printed circuit board is configured to constrain a power level to the electrical conduit. In some embodiments, the printed circuit board is configured to amplify a power level to the electrical conduit. As was discussed above, a low charge is needed in many cases but the variability of the power generated by the solar cell (depending on the amount of light) may necessitate that either the power is constrained (during peak light times) or amplified (during darker times).

Disclosed herein is a device for electrical stimulation to aid in plant growth. The device includes a self-contained power source within a housing, an electrical conduit coupled to the self-contained power source, the electrical conduit configured to conduct an electrical charge, a visual indicator, and a moisture meter incorporated into the housing. The visual indicator is configured to indicate to a user that the electrical conduit is conducting an electrical charge. The self-contained power source is configured to power the electrical charge, the visual indicator, and the moisture meter. Such embodiments are much like those described earlier but include a moisture meter. The moisture meter can help indicate when the soil or other medium needs more or less water and give an indication to the user in much the same way that the indicator shows whether the device is working. Such information may be transmitted as discussed above and is only not repeated here for the sake of brevity.

In some embodiments, the electrical conduit includes a first prong, the first prong configured to conduct the electrical charge and to be inserted into ground near a plant, and a second prong. The electrical charge is configured to pass through a medium between the first prong and the second prong.

In some embodiments, the self-contained power source comprises a solar cell. The device further comprises an energy storage device. The energy storage device is configured to store power generated by the solar cell and power the electrical charge when the solar cell is not charging. The device further comprises a printed circuit board within the housing, wherein the printed circuit board is configured to divert power to the visual indicator and the electrical conduit. The printed circuit board is configured to limit a power level to the electrical conduit.

Disclosed herein is a method for introducing an electrical stimulation to aid in plant growth. The method includes generating power via a self-contained power source within a housing, conducting an electrical charge from the self-contained power source to an electrical conduit, conducting power from the self-contained power source to a visual indicator on the housing, and enabling a visual indication that the electrical conduit is conducting an electrical charge.

In some embodiments, the self-contained power source is a solar cell. In some embodiments, the electrical conduit comprises a first and second prong. In some embodiments, the method further includes generating the electrical charge through a medium between the first and second prongs. In some embodiments, the printed circuit board constrains a power level to the electrical conduit.

Disclosed herein is a system for electrical stimulation to aid in plant growth. The system includes includes a device for stimulating an electrical current. The device includes a self-contained power source within a housing, an electrical conduit coupled to the self-contained power source, and a visual indicator. The electrical conduit is configured to conduct an electrical charge. The visual indicator is configured to indicate to a user that the electrical conduit is conducting an electrical charge. The self-contained power source is configured to power the electrical charge as well as the visual indicator.

In some embodiments, the electrical conduit includes a first prong, the first prong configured to conduct the electrical charge and to be inserted into ground near a plant.

In some embodiments, the electrical conduit includes a second prong, wherein the electrical charge is configured to pass through a medium between the first prong and the second prong.

In some embodiments, the self-contained power source includes a solar cell.

In some embodiments, the device further comprises an energy storage device, wherein the energy storage device is configured to store power generated by the solar cell and power the electrical charge when the solar cell is not charging.

In some embodiments, the energy storage device comprises a capacitor within the housing.

In some embodiments, the visual indicator is a mechanical visual indicator.

In some embodiments, the system further comprises a disabling switch for the visual indicator, wherein the disabling switch disables the visual indicator.

In some embodiments, the self-contained power source comprises a battery.

In some embodiments, the device further includes a printed circuit board within the housing, wherein the printed circuit board is configured to divert power to the visual indicator and the electrical conduit.

In some embodiments, the printed circuit board is configured to limit a power level to the electrical conduit.

Disclosed herein is a device for electrical stimulation to aid in plant growth. The device includes a housing, a self-contained power source within the housing, an electrical conduit coupled to the self-contained power source, the electrical conduit configured to conduct an electrical charge, and a visual indicator. The visual indicator is configured to indicate to a user that the electrical conduit is conducting an electrical charge. The self-contained power source is configured to power the electrical charge as well as the visual indicator.

In some embodiments, the electrical conduit includes a first prong, the first prong configured to conduct the electrical charge and to be inserted into ground near a plant, and a second prong, wherein the electrical charge is configured to pass through a medium between the first prong and the second prong.

In some embodiments, the self-contained power source comprises a solar cell.

In some embodiments, the device further comprises an energy storage device, wherein the energy storage device is configured to store power generated by the solar cell and power the electrical charge when the solar cell is not charging.

In some embodiments, the device further includes a printed circuit board within the housing, wherein the printed circuit board is configured to divert power to the visual indicator and the electrical conduit. The printed circuit board is configured to limit a power level to the electrical conduit.

Disclosed herein is a method for introducing an electrical stimulation to aid in plant growth. The method includes generating power via a self-contained power source within a housing, conducting an electrical charge from the self-contained power source to an electrical conduit, conducting power from the self-contained power source to a visual indicator on the housing, and enabling a visual indication that the electrical conduit is conducting an electrical charge.

In some embodiments, the self-contained power source is a solar cell. The electrical conduit includes a first and second prong and the method further includes generating the electrical charge through a medium between the first and second prongs.

In some embodiments, the method includes using a printed circuit board to dampen power to the electrical conduit.

In some embodiments, the storing power in an energy storage device within the housing and generating the electrical charge when the solar cell is not charging.

Referring now to FIG. 1, the Figure depicts a perspective view of a system and device for electrically stimulating plants 100, according to one or more embodiments of the invention. Although the system and device for electrically stimulating plants 100 is shown and described with certain components and functionality, other embodiments of the system and device for electrically stimulating plants 100 may include fewer or more components to implement less or more functionality.

FIG. 1 depicts a system and device for electrically stimulating plants 100 including a housing 115, a power source 120, a visual indicator 105, and two electrical prongs (or posts) which function as an electrical conduit 110. The housing may house various components including circuitry and electronic components that allow the system and device to function as indicated herein. The system and device for electrically stimulating plants 100 includes two prongs or posts between which an electrical current is configured to be generated. The prongs or posts may also function as physical posts that can be inserted into the ground such that the prongs or posts are not visible to an observer of the system and device for electrically stimulating plants 100.

The system and device for electrically stimulating plants 100 also includes a power source 120. In the illustrated embodiment, the power source 120 is a solar cell configured to generate power from the sun or another light source. Other types of power sources are also contemplated herein. The power source 120 is configured to generate the electrical current between the two prongs. The prongs act as an electrical conduit 110 that is configured to conduct an electrical charge.

The system and device for electrically stimulating plants 100 also includes a visual indicator 105. The visual indicator 105 is configured to visually indicate that the device is functioning and that an electrical charge is being generated to the electrical conduit 110. The visual indicator 105 may be an LED or light or other physical indicator capable of indicating the current status of the system and device for electrically stimulating plants 100. The visual indicator 105 is also powered by the same power source that generates the electrical current. In the illustrated embodiment, the power source 120 is a self-contained power source. That is, the power source is contained within the housing such that the device can function independently of an external power source. The housing 115 is shaped to appear like a smooth rock. Other types of aesthetic housings may be used. In some embodiments, the housing may also include a figurine on top of the housing.

Figure 2:
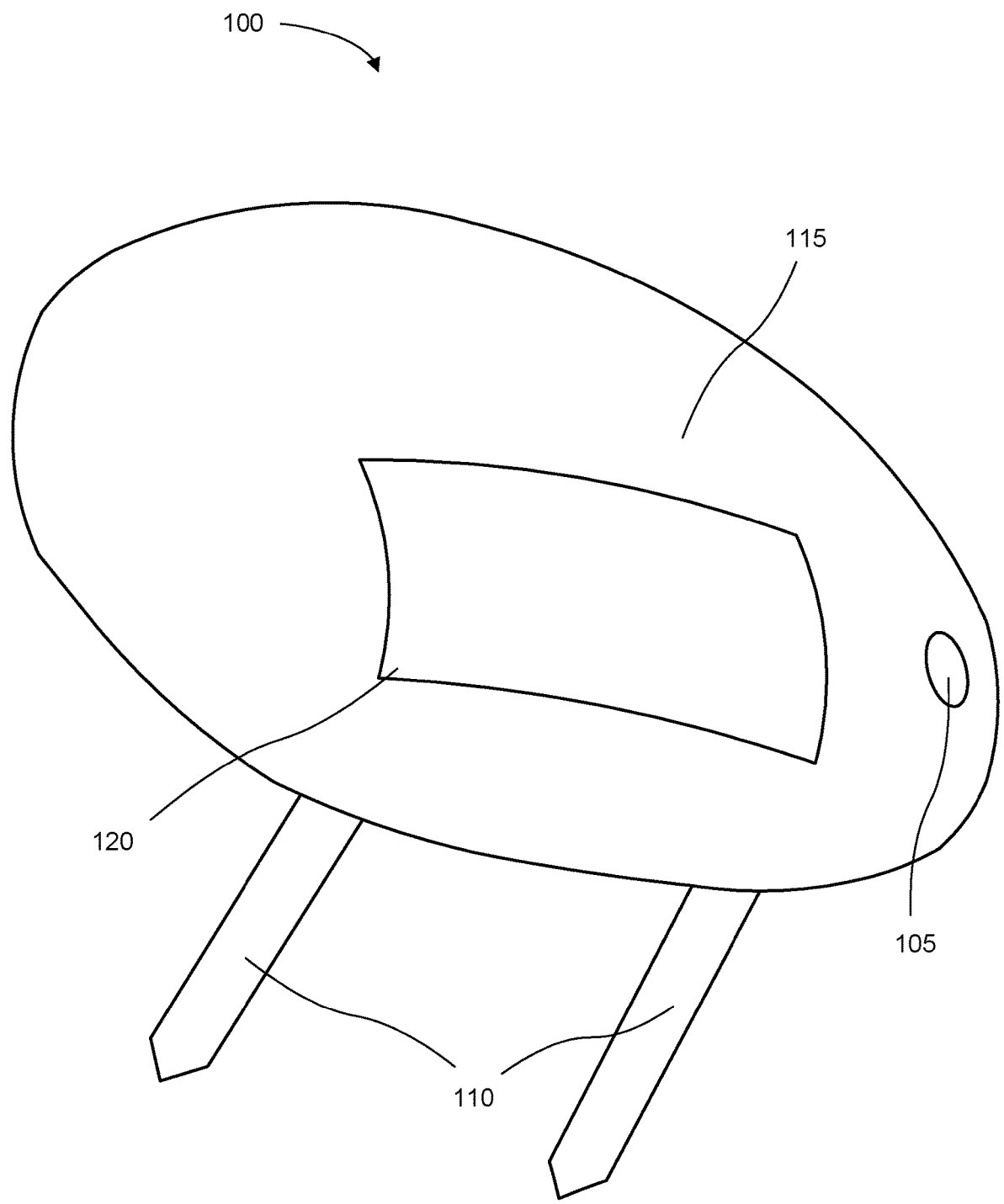
FIG. 2 depicts a side perspective view of a system and device for electrically stimulating plants, according to one or more embodiments of the invention.

Referring now to FIG. 2, the Figure depicts a side perspective view of a system and device for electrically stimulating plants, according to one or more embodiments of the invention. Although the system and device for electrically stimulating plants 100 is shown and described with certain components and functionality, other embodiments of the system and device for electrically stimulating plants 100 may include fewer or more components to implement less or more functionality.

FIG. 2 depicts a system and device for electrically stimulating plants 100 including a housing, a power source 120, a visual indicator 105, and two electrical prongs (or posts) 110. The system and device for electrically stimulating plants 100 of FIG. 2 may include all or some of the features already described in conjunction with FIG. 1.

Figure 3:
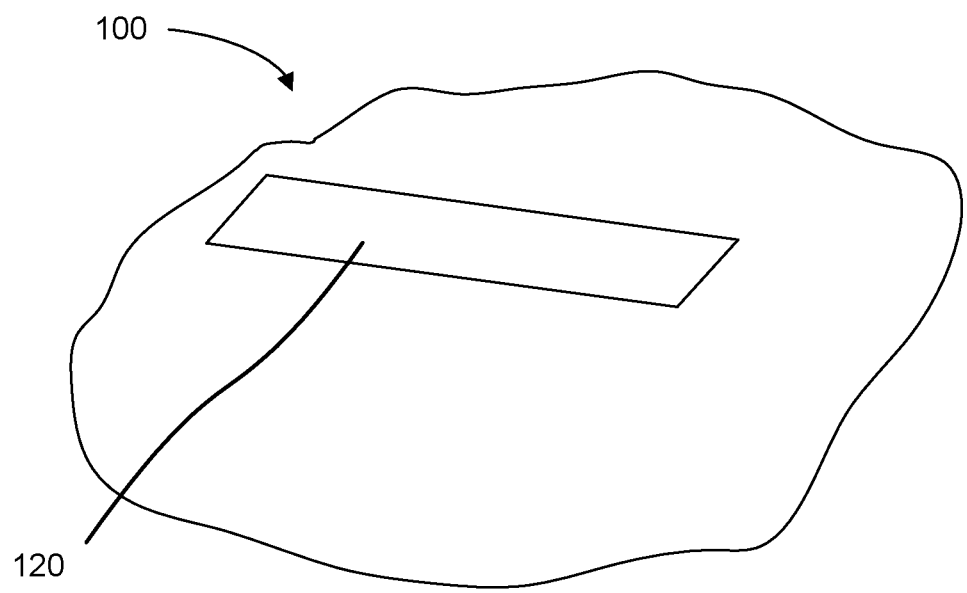
FIG. 3 depicts a perspective view of a system and device for electrically stimulating plants, according to one or more embodiments of the invention.

Referring now to FIG. 3, the Figure depicts a perspective view of a system and device for electrically stimulating plants, according to one or more embodiments of the invention. Although the system and device for electrically stimulating plants 100 is shown and described with certain components and functionality, other embodiments of the system and device for electrically stimulating plants 100 may include fewer or more components to implement less or more functionality.

FIG. 3 depicts a system and device for electrically stimulating plants 100 including a housing and a power source 120. In the illustrated embodiment, the housing is configured to look aesthetically pleasing by assuming the shape of a more jagged rock. The system and device for electrically stimulating plants 100 of FIG. 3 may include all or some of the features already described in conjunction with the previous Figures.

Figure 4:
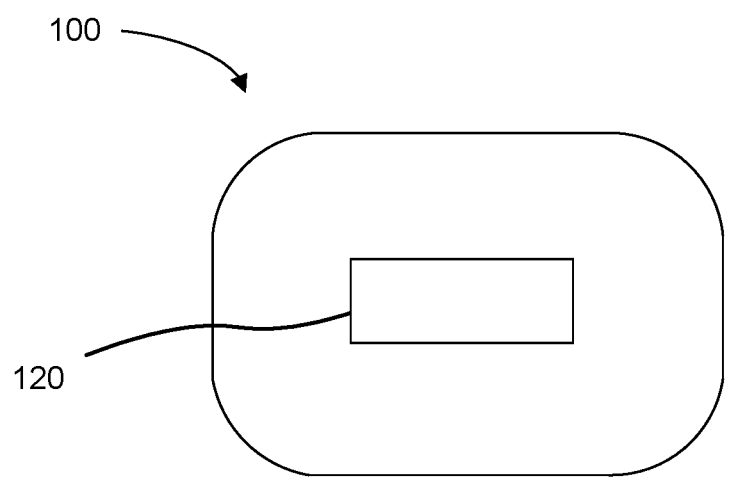
FIG. 4 depicts a top view of another embodiment of a system and device for electrically stimulating plants, according to one or more embodiments of the invention.

Referring now to FIG. 4, the Figure depicts a top view of another embodiments of a system and device for electrically stimulating plants, according to one or more embodiments of the invention. Although the system and device for electrically stimulating plants 100 is shown and described with certain components and functionality, other embodiments of the system and device for electrically stimulating plants 100 may include fewer or more components to implement less or more functionality.

FIG. 4 depicts a system and device for electrically stimulating plants 100 including a housing and a power source 120. In the illustrated embodiment, the housing is configured to look aesthetically pleasing but not appear as a rock. The system and device for electrically stimulating plants 100 of FIG. 4 may include all or some of the features already described in conjunction with the previous Figures although such features are not specifically described again.

Figure 5:
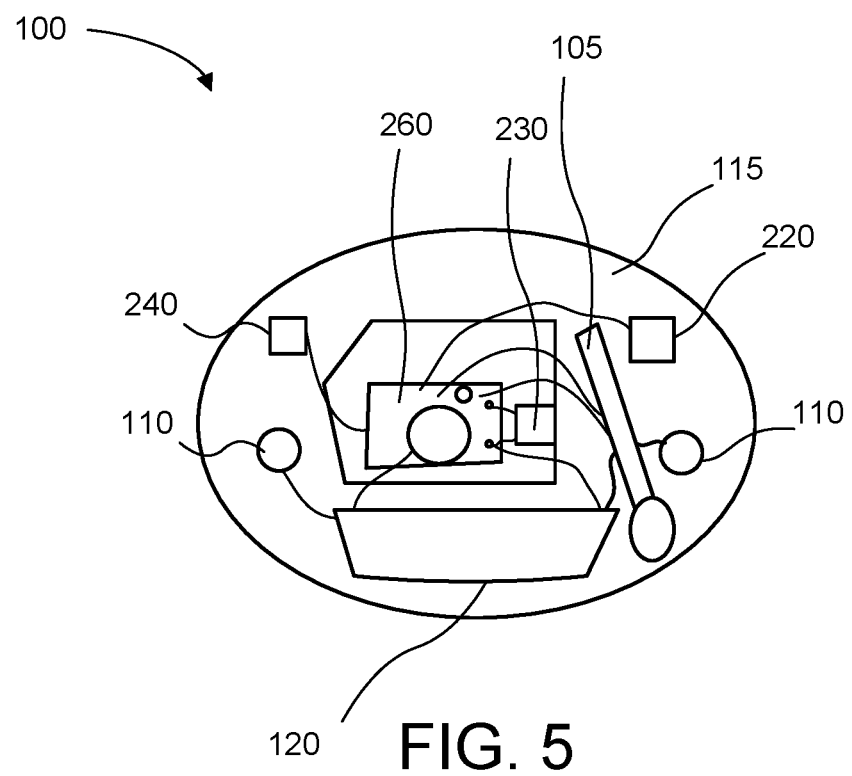
FIG. 5 depicts a view of the internal components of a system and device for electrically stimulating plants, according to one or more embodiments of the invention.

Referring now to FIG. 5, the Figure depicts an internal view showing the internal components of a system and device for electrically stimulating plants 100, according to one or more embodiments of the invention. Although the system and device for electrically stimulating plants 100 is shown and described with certain components and functionality, other embodiments of the system and device for electrically stimulating plants 100 may include fewer or more components to implement less or more functionality.

FIG. 5 depicts an internal view of a system and device for electrically stimulating plants 100 including a housing 115 (the top half of the housing has been removed), a power source 120, a visual indicator 105, and two electrical pads functioning as an electrical conduit 110. The system and device for electrically stimulating plants 100 of FIG. 5 may include all or some of the features already described in conjunction with the previous Figures although such features are not specifically described again. As can be seen, the system and device 100 includes other components including a printed circuit board 260, a moisture meter 220, an energy storage device 230 (in this case, a capacitor), and a transmitter or transmitting device 240 and various leads or wires within the housing that connect the various components. In the illustrated embodiment, the visual indicator 105 is a mechanical visual indicator that mechanically moves to indicate functionality. All the features and embodiments described above before the description of the Figures may be applied to the embodiment of FIG. 5 and are only not repeated for the sake of brevity.

Figure 6:
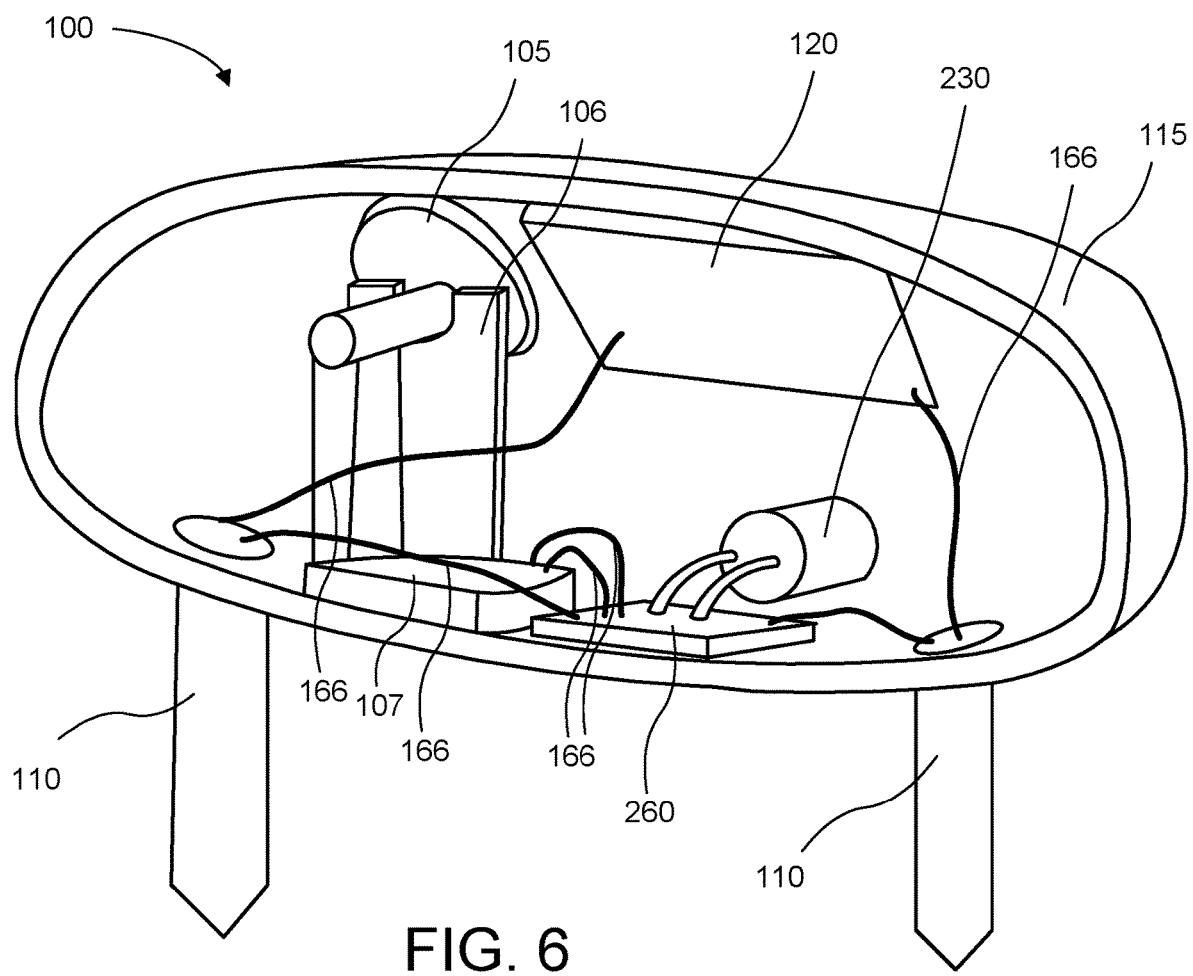
FIG. 6 depicts a perspective cutaway view showing the internal components of a system and device for electrically stimulating plants, according to one or more embodiments of the invention.

Referring now to FIG. 6, the Figure depicts a perspective cutaway view of a system and device for electrically stimulating plants, according to one or more embodiments of the invention. Although the system and device for electrically stimulating plants 100 is shown and described with certain components and functionality, other embodiments of the system and device for electrically stimulating plants 100 may include fewer or more components to implement less or more functionality.

FIG. 6 depicts some of the internal components of a system and device for electrically stimulating plants 100 including a housing 115 (which may be in two parts), a power source 120 (in this case, a solar cell), a visual indicator 105 (including a mechanical support 106, and a mechanical driver 107 that activates the mechanical movement of the visual indicator 105 after being driven by the printed circuit board 260), and two electrical prongs (or posts) that function as the electrical conduit. The system and device for electrically stimulating plants 100 of FIG. 6 may include all or some of the features already described in conjunction with the previous Figures and before although such features are not specifically described again. The embodiment shows various connections 166 that connect electronically the various components and drive the power of the various components.

Figure 7:
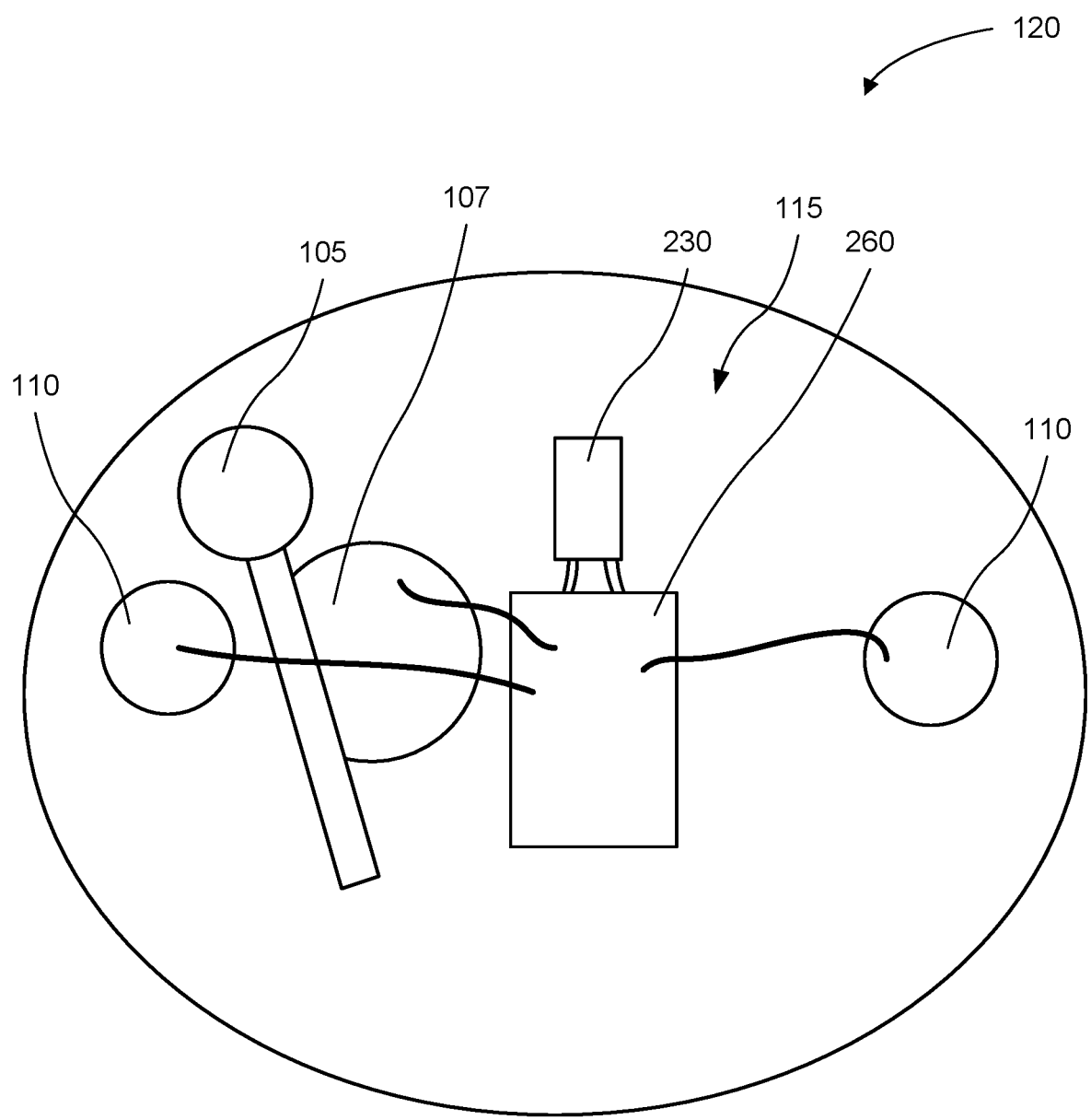
FIG. 7 depicts a top cutaway view showing the internal components of a system and device for electrically stimulating plants, according to one or more embodiments of the invention.

Referring now to FIG. 7, the Figure depicts a top cutaway view of a system and device for electrically stimulating plants, according to one or more embodiments of the invention. Although the system and device for electrically stimulating plants 100 is shown and described with certain components and functionality, other embodiments of the system and device for electrically stimulating plants 100 may include fewer or more components to implement less or more functionality.

FIG. 7 depicts a system and device for electrically stimulating plants 100 including a housing, a power source 120, a visual indicator 105, and two electrical pads that function as the electrical conduit 110. The electrical pads extend externally of the housing and an electrical charge may be generated between them into whatever medium is between the pads. In some embodiments, the medium is soil or another growing medium. In some embodiments, the medium is air near the plant. The system and device for electrically stimulating plants 100 of FIG. 7 may include all or some of the features already described in conjunction with the previous Figures and before although such features are not specifically described again.

Figure 8:
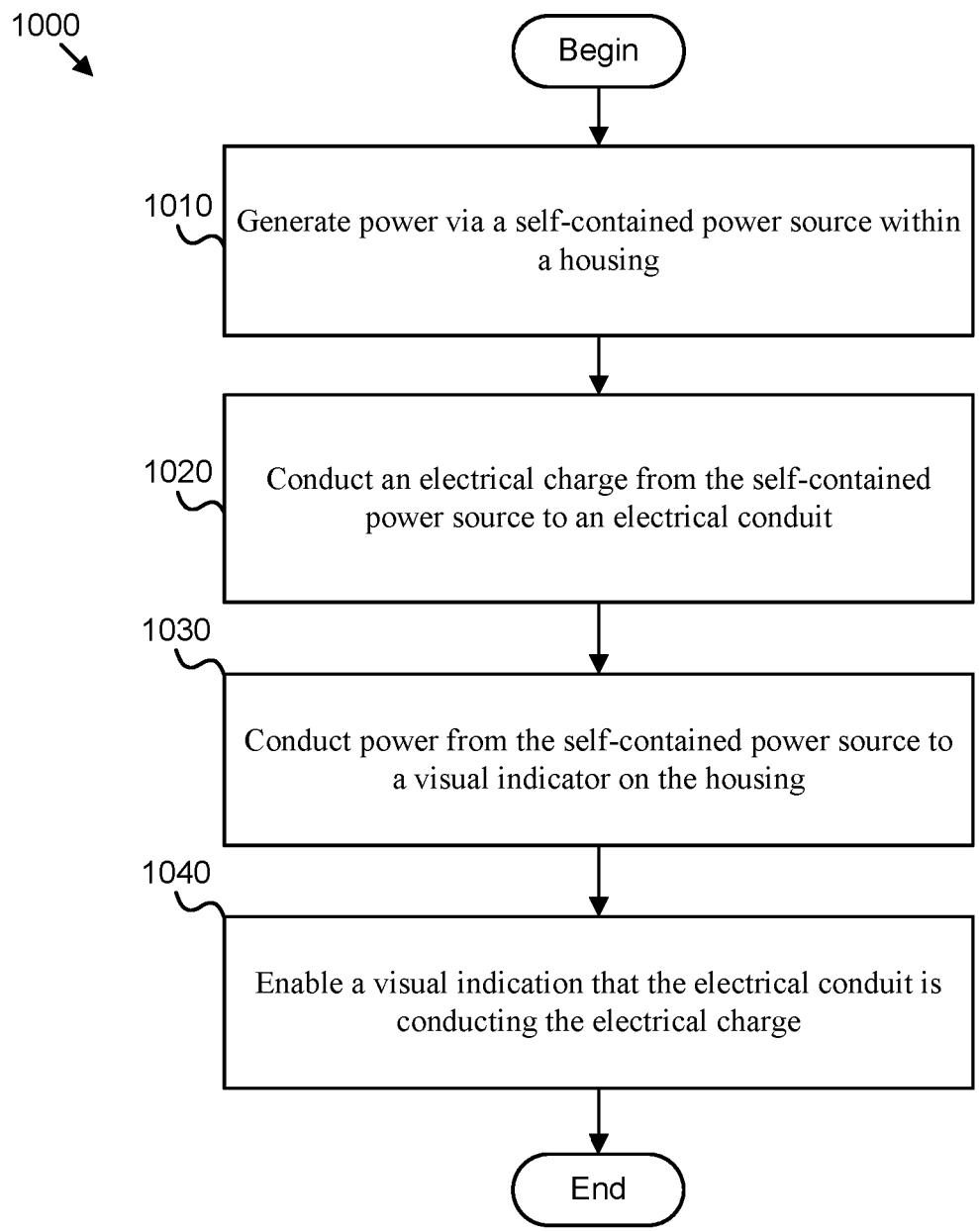
FIG. 8 depicts a block diagram of a method according to one or more embodiments of the present disclosure.

Referring now to FIG. 8, a flow chart diagram of a method 1000 is depicted. The method 1000 is a method for introducing an electrical stimulation to aid in plant growth. The method 1000 includes, at block 1010, generating power via a self-contained power source within a housing.

The method 1000 includes, at block 1020, conducting an electrical charge from the self-contained power source to an electrical conduit. The method 1000 includes, at block 1030, conducting power from the self-contained power source to a visual indicator on the housing.

The method 1000 includes, at block 1040, enabling a visual indication that the electrical conduit is conducting an electrical charge. The method then ends. The method may repeat some steps in an iterative manner while excluding some steps of the method.

In some embodiments, the self-contained power source is a solar cell. In some embodiments, the electrical conduit comprises a first and second prong. In some embodiments, the method further includes generating the electrical charge through a medium between the first and second prongs. In some embodiments, the printed circuit board constrains a power level to the electrical conduit.

Also contemplated herein are methods of using the system and device that include generating power and utilizing the power generated to power an electrical charge and simultaneously power a visual indicator configured to indicate that the device is working. Further contemplated in this disclosure methods of manufacture and assembly of the system and device.

Although the operations of the method(s) or processes herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

It should also be noted that at least some of the operations for the methods or processes described herein may be implemented using software instructions stored on a computer useable storage medium for execution by a computer. As an example, an embodiment of a computer program product includes a computer useable storage medium to store a computer-readable program or set of instructions that, when executed on a computer, causes the computer to perform operations, including the operations that may be carried out by the controllers or control processors. In one embodiment, a non-transitory computer-readable medium is configured to store code, software, and/or program instructions that, when executed on one or more processors, control the device. This code, software, and/or program instructions may include the method steps, processes, functions, features, aspects, and algorithms described herein.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

What is claimed is:

1. A system for electrical stimulation to aid in plant growth, the system comprising:
    a device for stimulating an electrical current, the device comprising:
        a self-contained power source within a housing;
        an electrical conduit coupled to the self-contained power source, the electrical conduit conducting an electrical charge; and
        a visual indicator, wherein the visual indicator indicates to a user that the electrical conduit is conducting an electrical charge,
        wherein the self-contained power source powers the electrical charge as well as the visual indicator;
    a first prong, the first prong inserted into ground near a plant;
    a second prong, wherein the electrical charge passes through a medium in the ground between the first prong and the second prong forming an electrical circuit running down the first prong through the medium and up through the second prong.

2. The system for electrical stimulation to aid in plant growth of claim 1, wherein the self-contained power source comprises:
    a solar cell.

3. The system for electrical stimulation to aid in plant growth of claim 2, wherein the device further comprises an energy storage device, wherein the energy storage device is configured to store power generated by the solar cell and power the electrical charge when the solar cell is not charging.

4. The system for electrical stimulation to aid in plant growth of claim 3, wherein the energy storage device comprises a capacitor within the housing.

5. The system for electrical stimulation to aid in plant growth of claim 1, wherein the device further comprises an energy storage device, wherein the energy storage device is configured to store power collected by an external source.

6. The system for electrical stimulation to aid in plant growth of claim 1, wherein the visual indicator is a mechanical visual indicator.

7. The system for electrical stimulation to aid in plant growth of claim 1, wherein the visual indicator is an electrical visual indicator.

8. The system for electrical stimulation to aid in plant growth of claim 1, further comprising a transmitting device, wherein the transmitting device is configured to transmit to a receiving device an indication of electrical charge in the electrical conduit.

9. The system for electrical stimulation to aid in plant growth of claim 1, wherein the system further comprises a disabling switch for the visual indicator, wherein the disabling switch disables the visual indicator.

10. The system for electrical stimulation to aid in plant growth of claim 1, wherein the self-contained power source comprises a battery.

11. The system for electrical stimulation to aid in plant growth of claim 1, wherein the device further comprises:
    a printed circuit board within the housing, wherein the printed circuit board is configured to divert power to the visual indicator and the electrical conduit.

12. The system for electrical stimulation to aid in plant growth of claim 11, wherein the printed circuit board is configured to constrain a power level to the electrical conduit.

13. The system for electrical stimulation to aid in plant growth of claim 11, wherein the printed circuit board is configured to amplify a power level to the electrical conduit.

14. A device for electrical stimulation to aid in plant growth, the device comprising:
    a self-contained power source within a housing;
        an electrical conduit coupled to the self-contained power source, the electrical conduit conducting an electrical charge; and
        a visual indicator, wherein the visual indicator indicating to a user that the electrical conduit is conducting an electrical charge,
        a moisture meter incorporated into the housing, and wherein the self-contained power source powers the electrical charge and the moisture meter, as well as the visual indicator;
    a first prong, the first prong inserted into ground near a plant; and
    a second prong, wherein the electrical charge passes through a medium in the ground between the first prong and the second prong forming an electrical circuit running down the first prong through the medium and up through the second prong.

15. The device for electrical stimulation to aid in plant growth of claim 14, wherein:
- the self-contained power source comprises a solar cell;
- the device further comprises an energy storage device;
- the energy storage device is configured to store power generated by the solar cell and power the electrical charge when the solar cell is not charging;
- the device further comprises a printed circuit board within the housing, wherein the printed circuit board is configured to divert power to the visual indicator and the electrical conduit; and
- printed circuit board is configured to limit a power level to the electrical conduit.

16. A method for introducing an electrical stimulation to aid in plant growth, the method comprising:
- generating power via a self-contained power source within a housing;
- conducting an electrical charge from the self-contained power source to an electrical conduit;
- conducting power from the self-contained power source to a visual indicator on the housing; and
- enabling a visual indication that the electrical conduit is conducting an electrical charge; and
- wherein the self-contained power source is a solar cell; and
- wherein the electrical conduit comprises a first and second prong; and
- generating the electrical charge through a medium between the first and second prongs, wherein a printed circuit board constrains a power level to the electrical conduit.

* * * * *